(12) United States Patent
Zhuo

(10) Patent No.: US 11,556,516 B2
(45) Date of Patent: Jan. 17, 2023

(54) DISTRIBUTED BLOCKCHAIN DATA STORAGE UNDER ACCOUNT MODEL

(71) Applicant: ALIPAY (HANGZHOU) INFORMATION TECHNOLOGY CO., LTD., Zhejiang (CN)

(72) Inventor: Haizhen Zhuo, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/213,451

(22) Filed: Mar. 26, 2021

(65) Prior Publication Data

US 2021/0216522 A1     Jul. 15, 2021

Related U.S. Application Data

(63) Continuation of application No. PCT/CN2020/085691, filed on Apr. 20, 2020.

(51) Int. Cl.
| | | |
|---|---|---|
| *G06F 16/23* | (2019.01) | |
| *G06F 16/901* | (2019.01) | |
| *H04L 9/06* | (2006.01) | |

(52) U.S. Cl.
CPC .......... *G06F 16/23* (2019.01); *G06F 16/9027* (2019.01); *H04L 9/0618* (2013.01); *H04L 2209/38* (2013.01)

(58) Field of Classification Search
CPC ... G06F 16/23; G06F 16/9027; H04L 9/0618; H04L 2209/38

(Continued)

(56) References Cited

U.S. PATENT DOCUMENTS

| 10,402,594 B2 * | 9/2019 | Takaai | H04L 9/3236 |
| 10,579,368 B2 * | 3/2020 | Wisnovsky | G06F 16/2365 |

(Continued)

FOREIGN PATENT DOCUMENTS

| CN | 108615156 | 10/2018 |
| CN | 109559234 A | 4/2019 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Phong H Nguyen
(74) *Attorney, Agent, or Firm* — Fish & Richardson P.C.

(57) ABSTRACT

Disclosed herein are methods, systems, and apparatus, including computer programs encoded on computer storage media, for blockchain data storage. One of the methods includes receiving a transaction associated with a blockchain network; determining, after the transaction is performed, an updated account state of a blockchain account involved in the transaction; adding, to a history state object database and after a current block is appended to a blockchain associated with the blockchain network based on performing a consensus algorithm, the updated account state, a hash value of the updated account state, an account identifier (ID) of the blockchain account, and a block ID of the current block; and updating, based on the hash value of the account state, the account ID, and the block ID, a state tree stored in a history state database.

20 Claims, 8 Drawing Sheets

(58) Field of Classification Search
USPC .......................................... 707/736, 741, 747
See application file for complete search history.

(56) References Cited

U.S. PATENT DOCUMENTS

| | | | |
|---|---|---|---|
| 10,860,259 | B1 | 12/2020 | Winarski |
| 11,113,272 | B2* | 9/2021 | Zhuo .................. G06Q 20/065 |
| 2016/0344737 | A1* | 11/2016 | Anton .................. G06F 21/6218 |
| 2017/0148016 | A1* | 5/2017 | Davis .................. H04L 9/3239 |
| 2017/0249482 | A1* | 8/2017 | Takaai ................ H04L 9/3263 |
| 2019/0018862 | A1 | 1/2019 | Wu |
| 2019/0018888 | A1 | 1/2019 | Madisetti et al. |
| 2020/0007313 | A1 | 1/2020 | Vouk et al. |
| 2020/0007314 | A1 | 1/2020 | Vouk et al. |
| 2020/0110728 | A1 | 4/2020 | Semenov et al. |
| 2020/0133939 | A1 | 4/2020 | Qiu et al. |
| 2020/0250333 | A1 | 4/2020 | Semenov et al. |
| 2020/0167345 | A1* | 5/2020 | Zhuo .................. G06F 16/2246 |
| 2020/0183915 | A1* | 6/2020 | Lu ...................... G06F 16/2365 |
| 2020/0334032 | A1* | 10/2020 | Smith ................... G06F 21/64 |
| 2020/0394154 | A1 | 12/2020 | Blackshear et al. |
| 2020/0401577 | A1 | 12/2020 | Ohashi et al. |
| 2021/0117960 | A1* | 4/2021 | Efremov .............. H04L 9/0894 |
| 2021/0243009 | A1* | 8/2021 | Kawahara ............. H04L 9/0637 |

FOREIGN PATENT DOCUMENTS

| | | |
|---|---|---|
| CN | 110287262 A | 9/2019 |
| CN | 110503558 | 11/2019 |
| CN | 110598434 | 12/2019 |
| CN | 110674128 | 1/2020 |
| CN | 110737664 | 1/2020 |
| CN | 110800008 | 2/2020 |
| CN | 110869967 A | 3/2020 |
| CN | 110945550 A | 3/2020 |
| CN | 111008201 A | 4/2020 |
| CN | 111630830 | 9/2020 |
| WO | WO2019120320 | 6/2019 |
| WO | WO2019120328 | 6/2019 |
| WO | WO2019142884 | 7/2019 |
| WO | WO2019179538 | 9/2019 |
| WO | WO2019179539 | 9/2019 |
| WO | WO 2019228550 A2 | 12/2019 |
| WO | WO2020143852 | 7/2020 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/084841, dated Jan. 20, 2021, 7 pages.

PCT International Search Report and Written Opinion in International Application No. PCT/CN2020/085691, dated Jan. 22, 2021, 8 pages.

Extended European Search Report in European Application No. 20739145.9, dated Jul. 28, 2021, 8 pages.

Extended European Search Report in European Application No. 20738121.1, dated Jul. 1, 2021, 7 pages.

Bernardini et al., "Blockchains meet distributed hash tables: Decoupling validation from state storage," CoRR, Submitted on Mar. 7, 2019, arXiv:1904.01935v1, 13 pages.

\* cited by examiner

DISTRIBUTED BLOCKCHAIN DATA STORAGE UNDER ACCOUNT MODEL

CROSS-REFERENCE TO RELATED APPLICATIONS

This application is a continuation of PCT Application No. PCT/CN2020/085691, filed on Apr. 20, 2020, which is hereby incorporated by reference in its entirety.

TECHNICAL FIELD

This specification relates to distributed blockchain data storage under account model.

BACKGROUND

Distributed ledger systems (DLSs), which can also be referred to as consensus networks and/or blockchain networks, enable participating entities to securely and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Blockchain-based programs can be executed by a distributed computing platform. For example, the distributed computing platform can include a virtual machine that provides the runtime environment for executing smart contracts. A blockchain computing platform can be viewed as a transaction-based state machine. State data in the platform can be assembled to a global shared-state referred to as a world state. The world state includes a mapping between account addresses and account states. The world state can be stored in content-addressed tree structures such as the Merkle Patricia tree (MPT).

Content-addressed state trees are incremental in nature. That is, changes of account states are reflected by adding new tree structures instead of updating values of the existing state tree. Therefore, the content-addressed state trees can grow very large in size as new transactions continuously enter into the blockchain. In some DLSs, every node stores an entire copy of the world state, which can take large amount of storage space. This is because all block data and state data are stored going back to the first transaction recorded to the blockchain, even if some state data associated with history blocks are rarely accessed.

Moreover, because each blockchain node is responsible for processing the entire blockchain network's transactional load, for a blockchain network with a large quantity of nodes, the computational and storage burden of each blockchain node can be very high. The large quantity of blockchain nodes can also result in a tree structure of the account states with large heights, which can significantly reduce the efficiency of traversing the state trees.

Accordingly, it would be desirable for state trees of a blockchain to be efficiently traversed for account state verification or update. It would also be desirable to easily add new state data existing tree structures. As such, storage and computational cost of the blockchain network can be saved without significantly affecting system performance and data integrity.

SUMMARY

Described embodiments of the subject matter can include one or more features, alone or in combination.

For example, in one embodiment, a computer-implemented method for storing blockchain data performed by a blockchain node is disclosed. The method comprises identifying, based on a transaction associated with a blockchain network, an account identifier (ID) of a blockchain account involved in the transaction, wherein the transaction is included in a current block to be appended to a blockchain associated with the blockchain network based on performing a consensus algorithm; updating, in a current state object database, an account state corresponding to the account ID of the blockchain account to an updated account state based on the blockchain transaction after the current block is appended to the blockchain; hashing the updated account state to generate a hash value of the updated account state; identifying, in a current state database, the hash value of the account state corresponding to the blockchain account based on the account ID of the blockchain account; and updating, in the current state database, the hash value of the account state to the hash value of the updated account state.

In some embodiments, the current state object database stores, for each blockchain account of the blockchain network, a mapping between an account ID and an account state of the corresponding blockchain account.

In some embodiments, the consensus algorithm is based on one of proof of work (PoW), proof of stake (PoS), and practical Byzantine fault tolerance (PBFT).

In some embodiments, the current state database stores hash values of account states of corresponding blockchain accounts in a state tree, and wherein account IDs and corresponding hash values of the account states are stored as key-value pairs.

In some embodiments, the state tree is a location-addressed state tree.

In some embodiments, the location-addressed state tree is a current state tree of a fixed-depth Merkle tree (FDMT) or a bucket tree.

In some embodiments, the account ID identifies a relative location of a branch node or a leaf node at a corresponding layer of the state tree for locating the hash value of the account state.

In some embodiments, the hash value of the account state corresponding to the blockchain account is a first hash value, the leaf node stores a plurality of hash values of account states associated with a plurality of blockchain accounts, and the account ID further identifies a relative location of the first hash value among the hash values stored in the leaf node.

In some embodiments, the consensus algorithm is performed after one or more of existence, validity, and authenticity of the transaction are verified.

In another embodiment, another computer-implemented method for storing blockchain data performed by a blockchain node is disclosed. The method comprises receiving a transaction associated with a blockchain network; determining, after the transaction is performed, an updated account state of a blockchain account involved in the transaction; adding, to a history state object database and after the current block is appended to a blockchain associated with the blockchain network based on performing a consensus algorithm, the updated account state, a hash value of the updated account state, an account ID of the blockchain account, and a block ID of a current block; and updating, based on the hash value of the account state, the account ID, and the block ID, a state tree stored in a history state database.

In some embodiments, the history state object database stores a mapping between an account ID, a block ID, a hash value of an account state, and an account state of each blockchain account of the blockchain network and an account state of the corresponding blockchain account.

In some embodiments, the consensus algorithm is based on one of PoW, PoS, and PBFT.

In some embodiments, the state tree is a content-addressed state tree.

In some embodiments, the content-addressed state tree is a history state tree of a FDMT or a MPT.

In some embodiments, updating the state tree includes adding one or more branch nodes and a leaf node under a state root associated with the current block and store the hash value of the updated account state, the account ID in the leaf node.

In some embodiments, the leaf node stores hash values of account states and account IDs corresponding to a plurality of blockchain accounts of the blockchain network.

In some embodiments, the account IDs identify relative locations of corresponding hash values of account states of the plurality of blockchain accounts stored in the leaf node.

In some embodiments, an address of the leaf node is a hash value generated based on the account states corresponding to the plurality of blockchain nodes.

In some embodiments, the consensus algorithm is performed after one or more of existence, validity, and authenticity of the transaction are verified.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
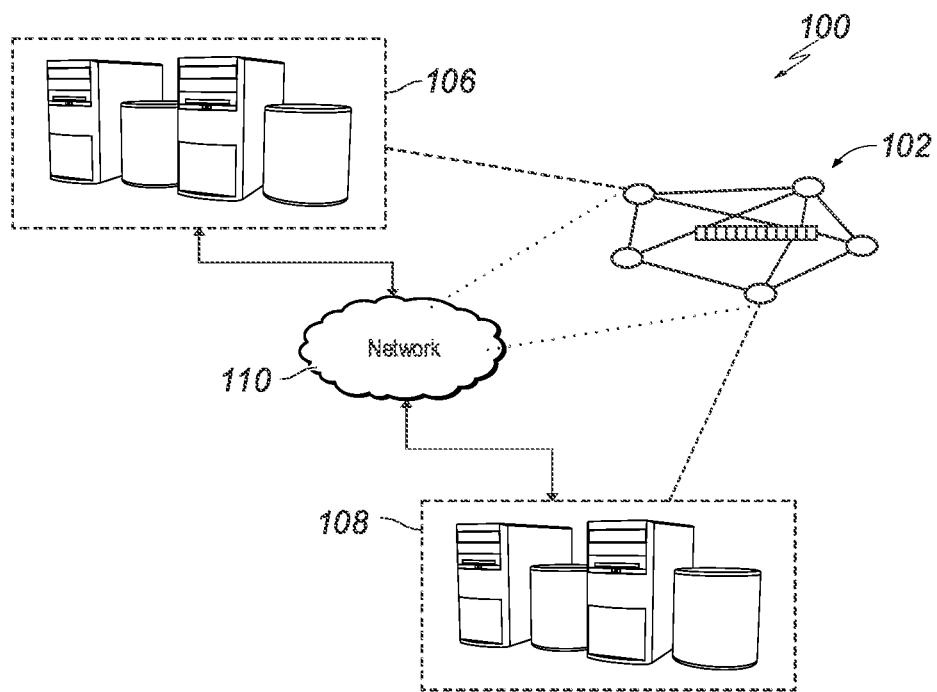
FIG. 1 depicts an example of an environment that can be used to execute embodiments of this specification.

This specification describes technologies for storing blockchain data. In some blockchain networks, state information of blockchains can be stored in location-addressed tree structures or content-addressed tree structures. For example, the location-addressed tree structures can include bucket tree or current state tree under the fixed-depth Merkle tree (FDMT) data structure. Content-addressed tree structures can include Merkle Patricia tree (MPT), sparse Merkle tree (SMT), or the history state tree under the FDMT data structure. Because each consensus node is responsible for processing the entire blockchain network's transactional load, for a blockchain network with a large number of nodes, the computational and storage burden of each blockchain node can be very high. The large number of blockchain nodes can also results in a complicated tree structure for storing account states. Moreover, content-addressed state trees are incremental in nature. That is, changes of account states are reflected by adding new tree structures instead of updating values of the existing state tree. Therefore, the MPTs or history state trees can grow large in size when blocks are continuously appended to the blockchain. As such, the efficiency of traversing and updating values in the state trees reduces as the size of the state trees increases.

The present specification describes technologies for storing state data in two separate databases. The first database stores account states or smart contracts as values of location-addressable key-value pairs (KVPs). The keys can be unique identifiers (IDs) of corresponding blockchain accounts. The second database stores a tree structure similar to the traditional tree structures (e.g., bucket tree or MPT) for storing state data. However, instead of directly storing account states in the leaf nodes, the leaf nodes in the second database store hash values of the corresponding account states, such that the storage consumption of the state data can be reduced.

The techniques described in this specification produce several technical effects. By storing the state information as KVPs in a location-addressed database, the KVPs can be efficiently retrieved or updated, especially when the blockchain network includes a large quantity of accounts. Moreover, because the hash values of the account states are much smaller in size as compared to the actual account states, storage consumption by the state tree can be significantly reduced by storing the hash values in the leaf nodes of a state tree.

In some embodiments, the leaf nodes of the state tree can further store KVPs in buckets. That is, instead of storing a pair of KVP corresponding to hash value of an account state, a plurality of KVPs corresponding to hash values of a plurality of account states can be stored in a leaf node as a KVP bucket. As such, the number of leaf nodes needed to store the hash values can be reduced. Correspondingly, the height and complexity of the state tree can be reduced to allow faster traversing and updating of the values. Storing the KVPs in buckets is especially suitable when a large amount of accounts (e.g., hundreds of millions) exist in the blockchain network to improve data processing efficiency.

In some embodiments, a separate database can be used to store infrequently accessed account information. The infrequently accessed account information can be stored in a lower-level storage medium with lower storage cost, and can be loaded to a higher-cost database to be updated on a need-basis. As such, the overall account state traversing and update efficiency can be improved, and the storage cost can be reduced.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing device that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
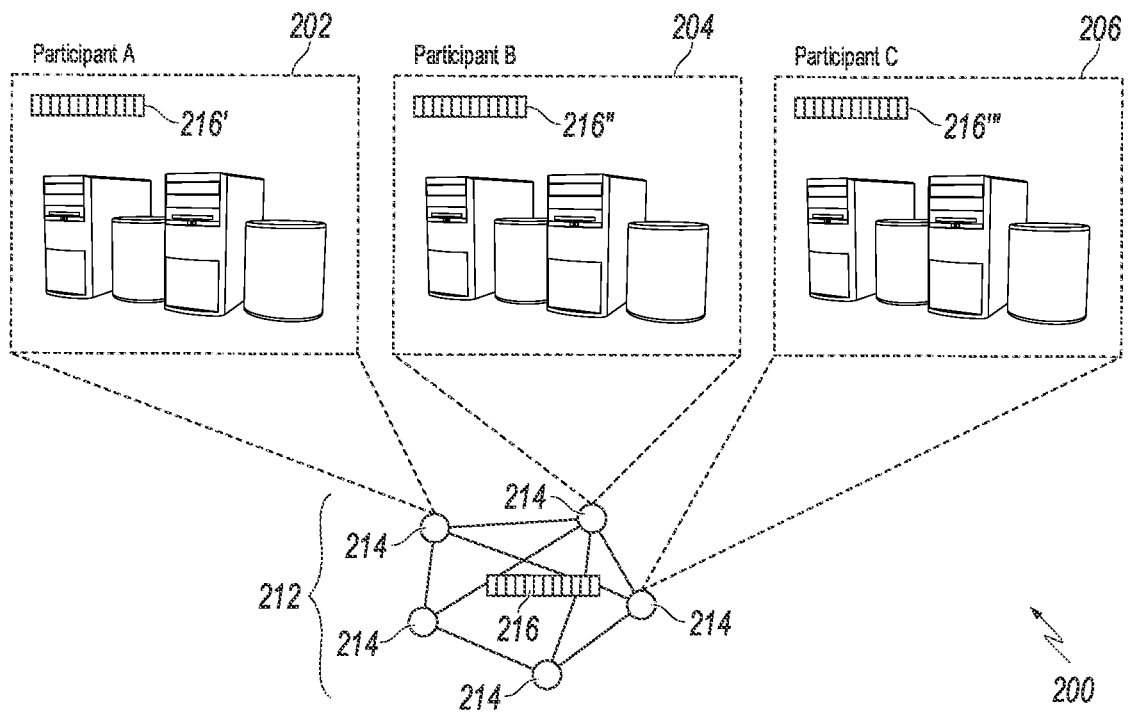
FIG. 2 depicts an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216'', and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

Figure 3:
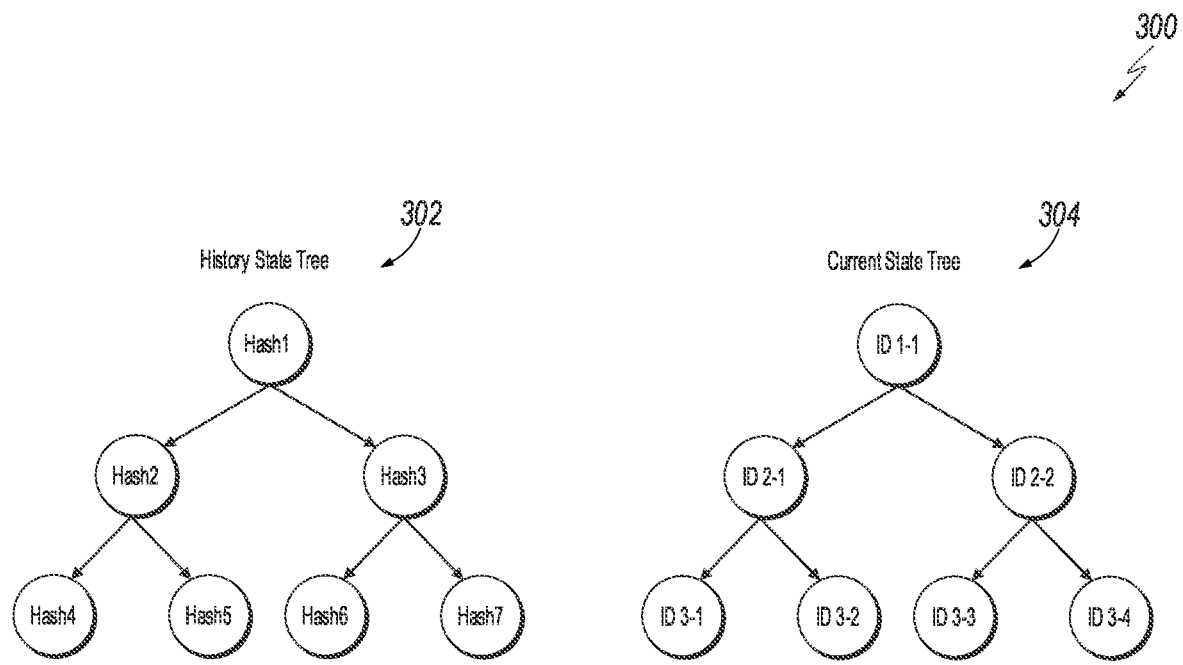
FIG. 3 depicts an example of a fixed depth Merkle tree (FDMT) data structure in accordance with embodiments of this specification.

FIG. 3 depicts an example of an FDMT data structure 300 in accordance with embodiments of this specification. Under FDMT, account states can be stored as KVPs in the structures of a history state tree 302 and a current state tree 304. The keys in the KVPs correspond to addresses that uniquely identify values of blockchain accounts. The history state tree 302 can include an entire copy of available state information of the blockchain. The current state tree 304 can include state information of a current block. When a new block is created, the current state tree 304 is updated with state information associated with the new block. Therefore, the size of the current state tree 304 can be significantly smaller than the size of the history state tree 302.

In some embodiments, the current state tree 304 can be a location-addressed state tree. For a location-addressed state tree, a node value of the current state tree 304 can be retrieved based on a key (e.g., a node ID) that uniquely identifies a corresponding node of the current state tree 304. When a new node is added to the current state tree 304, a node value can be associated with its unique node ID (e.g., ID 1-1, ID 2-1, etc. of the current state tree 304) without regard to its content. The KVP of a node of the current state tree 304 can be expressed as <node ID, node value>.

In some cases, a key can further include a corresponding block ID associated with the node value. In such cases, the node ID can serve as prefix and the block ID can serve as suffix of the key. The KVP of the current state tree 304 can then be expressed as <node ID+block ID, node value>.

The history state tree 302 can be a content-addressed state tree. For a content-addressed state tree, each account value can have a content address uniquely associated with the account value itself. For example, the key of a node can be generated by hashing the value of the node. To retrieve information from a history state tree 302, a content identifier can be provided, from which the location of the account value can be determined and retrieved. Similar to the MPT, each node of the history state tree 302 can include a hash value of a pointer (e.g., Hash1, Hash2, and Hash3 under the history state tree 302) pointing to the next node of the tree. Following paths of the pointers, the leaf nodes have keys corresponding to end portions of the hash values (e.g., Hash4, Hash5, Hash6, and Hash7 under the history state tree 302) and the values with which the keys are paired. KVPs of the history state tree 302 can be expressed as <hash(node value), node value>.

Since node keys are dependent on node values for content-addressed trees, new state information can be added as additional tree structure to the history state tree 302 rather than making changes to the existing tree in order to preserve existing tree structure and improve data storage/retrieval efficiency.

Figure 4:
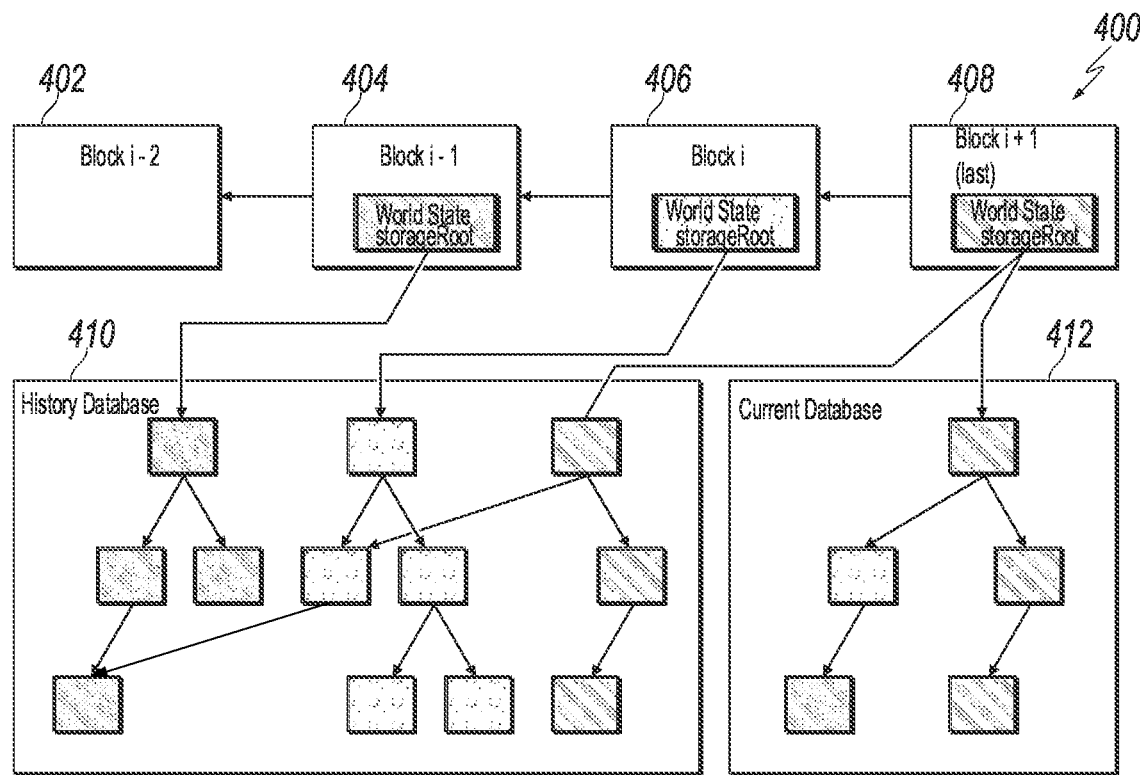
FIG. 4 depicts examples of databases for storing blockchain data in accordance with embodiments of this specification.

FIG. 4 depicts an example 400 of storing state information associated contract accounts of a blockchain in accordance with embodiments of this specification. The databases can be, for example, key-value databases such as LevelDB or RocksDB. The databases can store data under the FDMT data structure, which includes a history database 410 for storing history state tree and a current database 412 for storing current state tree. Of the four blocks depicted in FIG. 4, block i−2 402, block i−1 404, and block i 406 are history blocks previously appended to the blockchain, while block i+1 408 is a current block. Each block can have a block header and a block body. The block header can include information such as a storageRoot of a contract account under a world state. The storageRoot can serve as a secure and unique identifier of the contract account state trees. In other words, the storageRoot can be cryptographically dependent on account states. The block body can include confirmed transactions of a corresponding account of a block.

As described, the history database 410 can store the history state tree, and the current database 412 can store the current state tree. The history state tree and current state tree can store history and current account states, respectively. Account states can include information about blockchain account (e.g., number of transactions sent by an account). Each account can have an account state. As an example, Ethereum blockchain accounts can include externally owned accounts and contract accounts. Externally owned accounts can be controlled by private keys and are not associated with any code for executing smart contract. Contract accounts can be controlled by their contract code, which can be used for executing smart contract.

States of Ethereum accounts can include four components: nonce, balance, codeHash, and storageRoot. If the account is an externally owned account, the nonce can represent the number of transactions sent from the account address. The balance can represent the digital assets owned by the account. The codeHash can be the hash of an empty string. The storageRoot can be empty. If the account is a contract account, the nonce can represent the number of contracts created by the account. The balance can represent the digital assets owned by the account. The codeHash can be the hash of a virtual machine code associated with the account. The storageRoot can store a root hash associated with a storage tree or contract state tree. The contract state tree can store contract data. The contract state tree can also have a FDMT structure, which includes a current state tree and a history state tree.

The history state tree can include an entire copy of account states of the blockchain from a genesis block, and can be updated according to transaction executions. For example, a root hash stored in previous block i−1 404 is a root hash of the world state at the time block i−1 404 is completed. The world state is associated with all transactions stored in block i−1 404 and blocks prior to block i−1 404. Similarly, a root hash stored in the current block i+1 408 is a root hash of the world state associated with all transactions stored in block i+1 408 and blocks prior to block i+1 408.

The current state tree can include state information that is updated or added due to transactions being newly added to the current block i+1 408. As discussed in the description of FIG. 3, the history state tree can store state information as KVPs expressed as <hash(node value), node value>, such that the node values can be content-addressable. In some embodiments, the current state tree can be location-addressed based on one or more location-related IDs. For example, the current state tree can store state information as KVPs expressed as <node ID, node value>, where the node values can be addressed based on their corresponding node IDs. As another example, the keys of the KVPs can be a combination of the node ID and the corresponding block ID of the node value. The node ID can serve as prefix and the block ID can serve us suffix of keys for traversing values of an FDMT or MPT.

Figure 5:
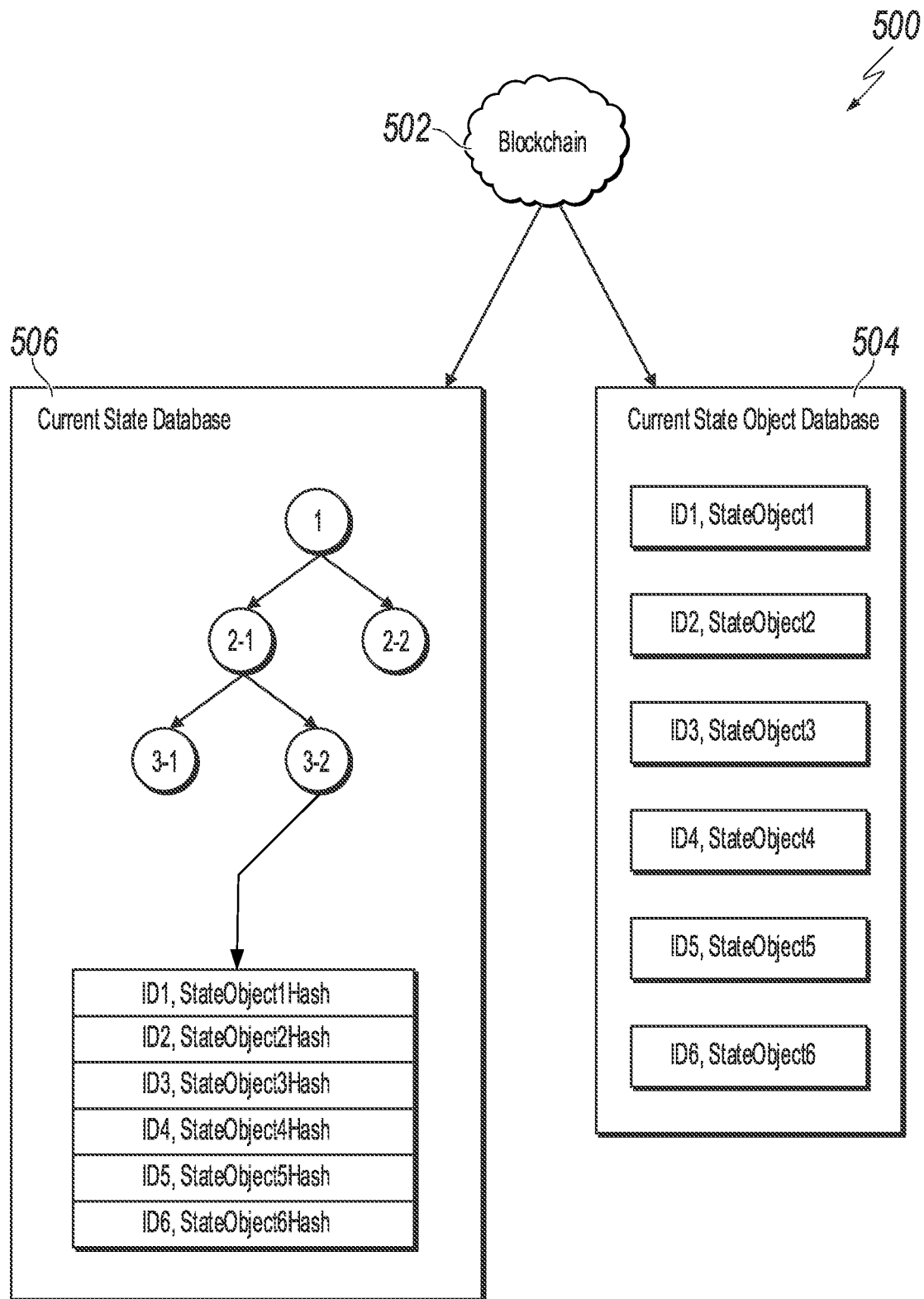
FIG. 5 depicts examples of databases for storing current block data in accordance with embodiments of this specification.

FIG. 5 depicts examples of databases for storing current block data in accordance with embodiments of this specification. At a high-level, the current state data of a blockchain 502 is stored in a current state object database 504 and a current state database 506. For example, the current state object database 504 or the current state database 506 can be a RocksDB or a LevelDB. As described earlier, the current states are account states associated with transactions to be stored in a current block of the blockchain 502. The current state object database 504 is a key-value database that stores KVPs. The values of the KVPs are the account states (or state objects) of accounts associated with the blockchain 502. The keys are unique IDs corresponding to the values.

The current state database 506 stores a state tree that can be used to traverse the current state data. In some examples, the state tree stored in the current state database 506 can be a current state tree of a FDMT. In some examples, the state tree can be a bucket tree. The nodes of the state tree in the current state database 506 stores KVPs which are also location-addressed. The keys of the KVPs are node IDs of the state tree. The values stored in the leaf nodes are hash values of the corresponding account states. As compared to traditional state trees that store actual account states in the leaf nodes, storing the hash values of the account states can reduce the storage space consumed by the state trees.

In some embodiments, the leaf nodes can further store KVPs in buckets. That is, instead of storing a pair of KVP corresponding to hash value of an account state, a plurality of KVPs corresponding to hash values of a plurality of account states can be stored in a leaf node as a KVP bucket. As such, the number of leaf nodes needed to store the hash values can be reduced. Correspondingly, the height and complexity of the state tree can be reduced to allow faster traversing and updating of the values. Storing the KVPs in buckets is especially suitable when a large amount of accounts (e.g., hundreds of millions) exist in the blockchain network to improve data processing efficiency.

In some embodiments, the account states can be kept under the account model (or balance model). Under the account model, each user's account balance is tracked as a global state. Instead of recording the transactions under the unspent transaction output (UTXO) model, the updated account states are recorded after performing the transaction through consensus under the account model. Before the consensus nodes perform a consensus algorithm to record transactions in a block, a pre-verification process can be performed. The pre-verification process is performed to screen malicious transactions that may be used by attackers to flush the blockchain network. For example, for each transaction, a balance of a spending account is checked during the pre-verification process to make sure it is larger than or equal to the transaction amount. The pre-verification process can also include operations such as validating the transaction, verifying digital signatures, and verifying the existence of accounts, etc.

After the transactions are validated through pre-verification, the consensus nodes can perform a consensus algorithm to add the corresponding block to the blockchain 502. After the consensus is reached, the transactions are executed and the corresponding account states of the accounts involved in the transactions are updated accordingly.

Updating the account states can include updating both the current state object database 504 and the current state database 506. As described earlier, each state object (value) corresponds to a unique ID (key). In other words, there is a one-to-one mapping relationship between the state object and its unique ID. The current state object database 504 stores the mapping relationship. To update the state objects, the blockchain nodes can directly locate the accounts involved in the transactions based on the unique IDs and update the state objects according to the mapping relationship.

In some embodiments, a separate database can be used to store extra account information. The extra account information can include those infrequently accessed, stale account data, or data associated with inactive accounts. The extra account information can be loaded to the current state object database 504 to be updated on a need-basis. In some embodiments, the database for storing the extra account information can also have a lower storage cost as compared to the current state object database 504 or the current state database 506. As such, the storage burden of the current state object database 504 and the current state database 506 can be reduced, the overall account state traversing and updating efficiency can be improved, and the storage cost can be reduced.

The hash values of the updated state objects can be used to update the current state database 506. The current state database 506 stores the tree structure and hash values of the state objects. For example, assume that the state object 2 is associated with a transaction included in the latest block. ID2 corresponding to state object 2 can be expressed as "0x122". The expression of the ID2 provides an address for navigating through the state tree stored in the current state database 506 to locate the KVP associated with the ID2. The "0x" represents that the ID is structured in hexadecimal format. To update the KVP associated with ID2, the navigation can start from the one and only root node of the current state tree in the current state database 506. The first digit "1" after "0x" represents that the next node to locate the KVP is the first of the two nodes (i.e., node 2-1) in the second layer of the tree. The second digit "2" represents the next node to locate the KVP is the second of the two leaf nodes (i.e., node 3-2). In this example, node 3-2 stores a bucket of six KVPs. The third digit "2" represents that the KVP to be updated is the second KVP in the bucket. After identifying the KVP, the existing hash value of the old state object 2 can be replaced by the hash value calculated based on the new state object 2 after the transaction is executed. As such, the new state object 2 is updated in both the current state object database 504 and the current state database 506.

Figure 6:
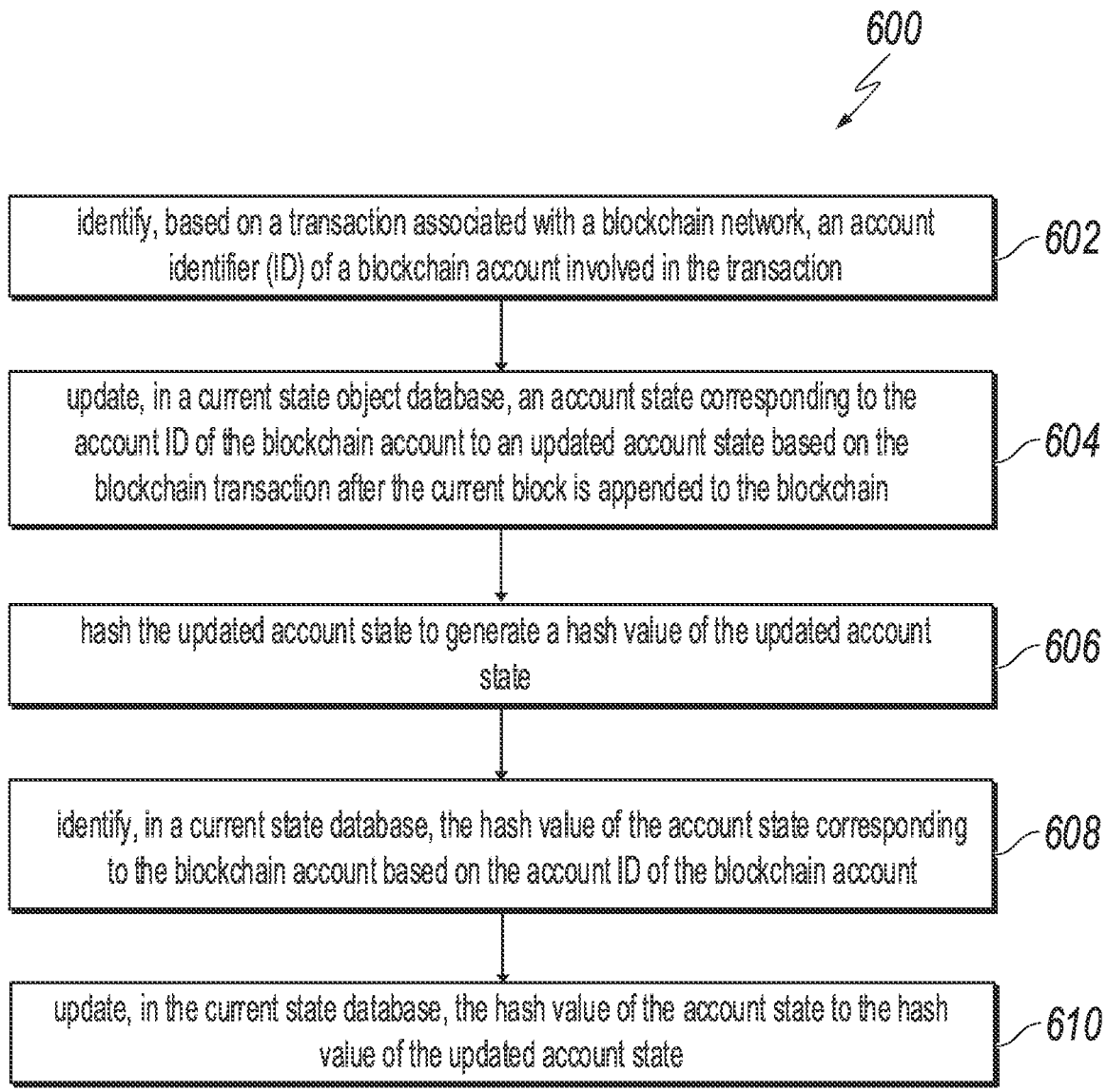
FIG. 6 depicts an example of a process that can be executed in accordance with embodiments of this specification.

FIG. 6 depicts an example of a process 600 that can be executed in accordance with embodiments of this specification. For convenience, the process 600 will be described as being performed by a system of one or more computers, located in one or more locations, and programmed appropriately in accordance with this specification. For example, a computing device in a computing system, e.g., the computing system 106, 108 of FIG. 1, appropriately programmed, can be a blockchain node that performs the process 600.

At 602, the blockchain node identifies, based on a transaction associated with a blockchain network, an account ID of a blockchain account involved in the transaction, wherein the transaction is included in a current block to be appended to a blockchain associated with the blockchain network based on performing a consensus algorithm. In some embodiments, the consensus algorithm is based on one of PoW, PoS, and PBFT. In some embodiments, the consensus algorithm is performed after one or more of existence, validity, and authenticity of the transaction are verified.

At 604, the blockchain node updates, in a current state object database, an account state corresponding to the account ID of the blockchain account to an updated account state based on the blockchain transaction after the current block is appended to the blockchain. In some embodiments, the current state object database stores, for each blockchain account of the blockchain network, a mapping between an account ID and an account state of the corresponding blockchain account.

In some embodiments, the current state database stores hash values of account states of corresponding blockchain accounts in a state tree, and wherein account IDs and corresponding hash values of the account states are stored as key-value pairs. In some embodiments, the state tree is a location-addressed state tree. In some embodiments, the location-addressed state tree is a current state tree of a FDMT or a bucket tree.

At 606, the blockchain node hashes the updated account state to generate a hash value of the updated account state.

At 608, the blockchain node identifies, in a current state database, the hash value of the account state corresponding to the blockchain account based on the account ID of the blockchain account. In some embodiments, the account ID identifies a relative location of a branch node or a leaf node at a corresponding layer of the state tree for locating the hash value of the account state.

At 610, the blockchain node updates, in the current state database, the hash value of the account state to the hash value of the updated account state. In some embodiments, the hash value of the account state corresponding to the blockchain account is a first hash value, the leaf node stores a plurality of hash values of account states associated with a plurality of blockchain accounts, and the account ID further identifies a relative location of the first hash value among the hash values stored in the leaf node.

Figure 7:
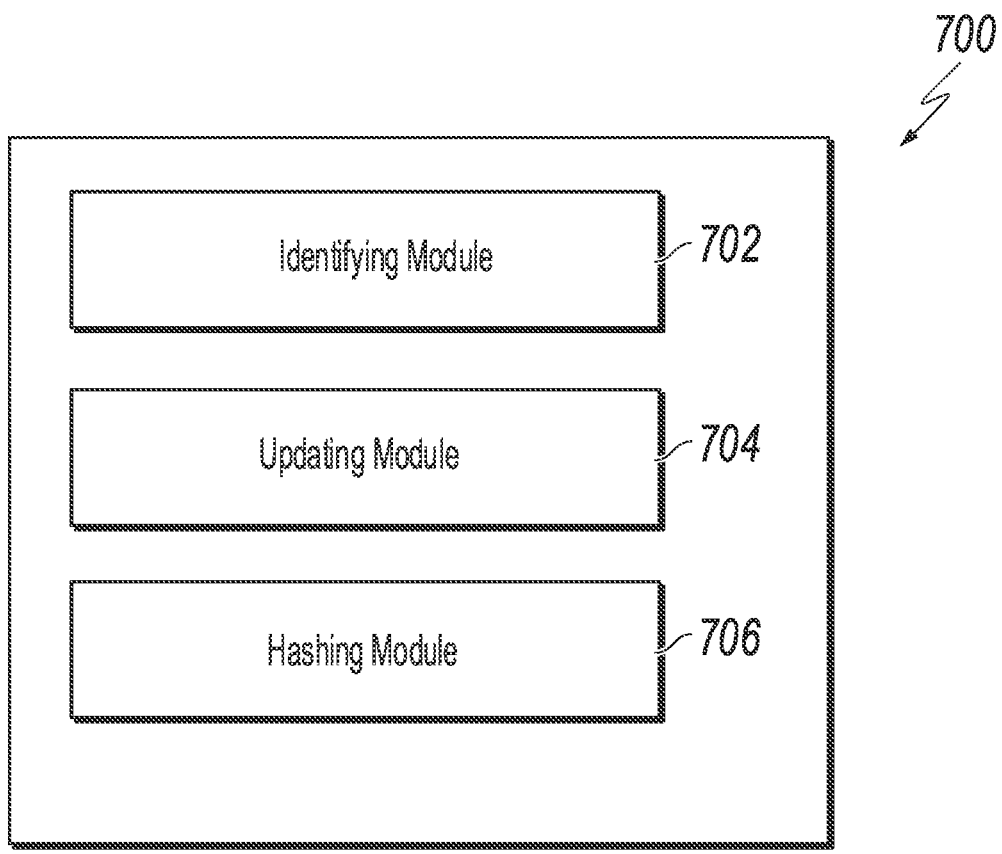
FIG. 7 depicts examples of modules of an apparatus in accordance with embodiments of this specification.

FIG. 7 depicts examples of modules of an apparatus 700 in accordance with embodiments of this specification. The apparatus 700 can be an example of an embodiment of a blockchain node configured to store blockchain data. The apparatus 700 can correspond to the embodiments described above, and the apparatus 700 includes the following: an identifying module 702 that identifies an account ID of a blockchain account involved in the transaction, wherein the transaction is included in a current block to be appended to a blockchain associated with the blockchain network based on performing a consensus algorithm; in a current state object database, an updating module 704 that updates an account state corresponding to the account ID of the blockchain account to an updated account state based on the blockchain transaction after the current block is appended to the blockchain; a hashing module 706 that hashes the updated account state to generate a hash value of the updated account state; the identifying module 702 that identifies, in a current state database, the hash value of the account state corresponding to the blockchain account based on the account ID of the blockchain account; and the updating module 704 that updates, in the current state database, the hash value of the account state to the hash value of the updated account state.

In some embodiments, the current state object database stores, for each blockchain account of the blockchain network, a mapping between an account ID and an account state of the corresponding blockchain account. In some embodiments, the consensus algorithm is based on one of PoW, PoS, and PBFT.

In some embodiments, the current state database stores hash values of account states of corresponding blockchain accounts in a state tree, and wherein account IDs and corresponding hash values of the account states are stored as key-value pairs.

In some embodiments, the state tree is a location-addressed state tree. In some embodiments, the location-addressed state tree is a current state tree of a FDMT or a bucket tree. In some embodiments, the account ID identifies a relative location of a branch node or a leaf node at a corresponding layer of the state tree for locating the hash value of the account state.

In some embodiments, the hash value of the account state corresponding to the blockchain account is a first hash value, the leaf node stores a plurality of hash values of account states associated with a plurality of blockchain accounts, and the account ID further identifies a relative location of the first hash value among the hash values stored in the leaf node. In some embodiments, the consensus algorithm is performed after one or more of existence, validity, and authenticity of the transaction are verified.

Figure 8:
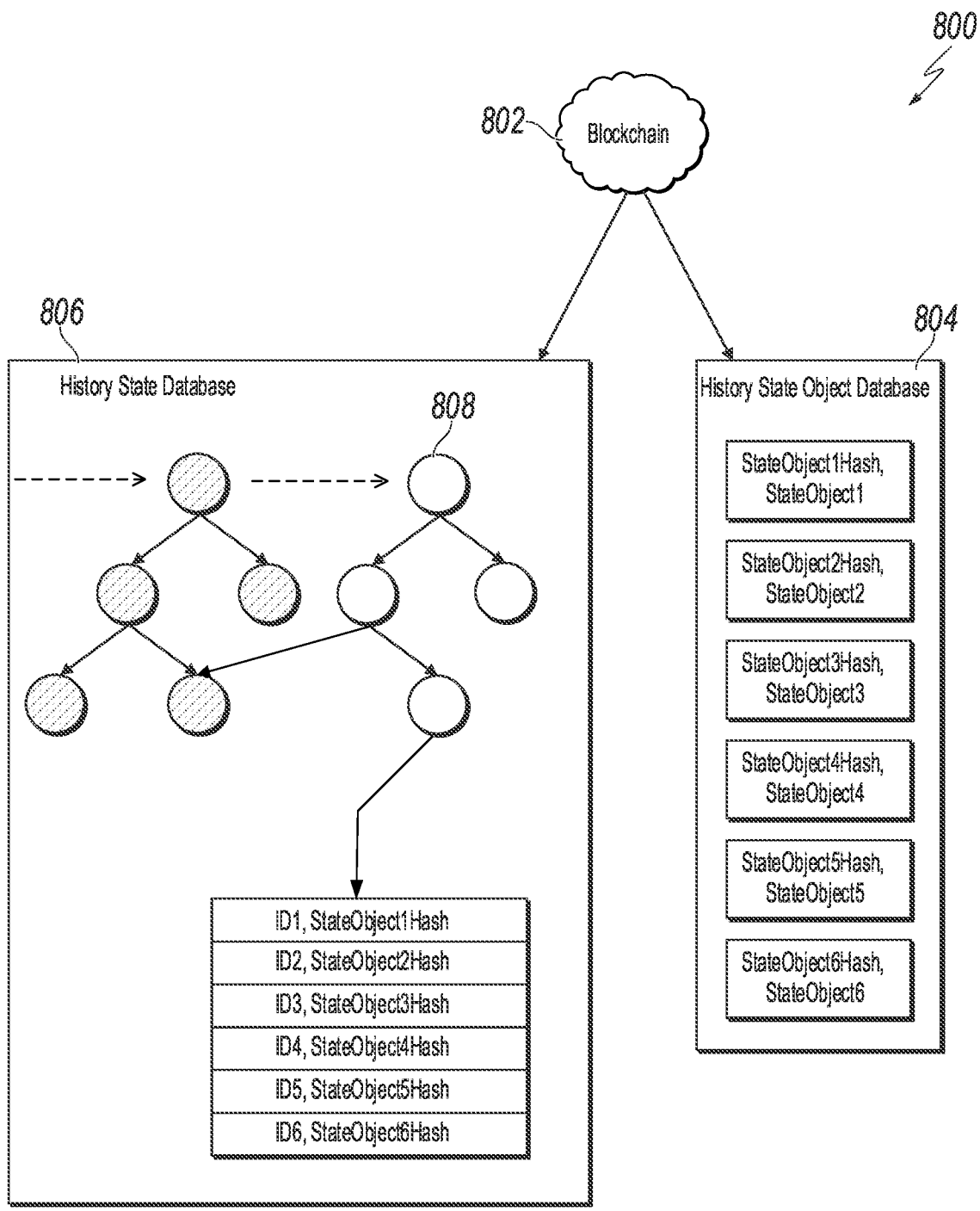
FIG. 8 depicts examples of databases for storing history block data in accordance with embodiments of this specification.

FIG. 8 depicts examples of databases for storing history block data in accordance with embodiments of this specification. At a high-level, the history state data of a blockchain 802 is stored in a history state object database 804 and a history state database 806. For example, the history state object database 804 or the history state database 806 can be a RocksDB or a LevelDB. As described earlier, the history data can be stored in a data structure such as a history state tree of a FDMT or an MPT. The history state data includes state data corresponding to each and every block of the blockchain since the genesis block. For example, if an account is updated based on a transaction included in block 50, the account state can be verified or updated by traversing through the root node corresponding to block 50 down to the leaf node that stores the account state.

The history state object database 804 is a key-value database that stores KVPs. The values of the KVPs are the history account states (or history state objects) associated with the blockchain 802. The keys are hash values of the corresponding history account states.

The history state database 806 stores tree structures of state data corresponding to every block of the blockchain. The state trees in the history state database 806 stores KVPs that are content-addressable. The KVPs for the branch nodes are values and their hashes similar to an MPT.

The value of a leaf node can be KVPs stored in a bucket as discussed in the description of FIG. 5. That is, a plurality of KVPs corresponding to a plurality of account states stored as a KVP bucket. The key of the leaf node can be generated based on the KVP bucket. For example, the key can be a hash value of a combination of all values of the KVPs in the KVP bucket. For the KVPs stored in the KVP bucket, the values are hash values of corresponding account states. The keys are account IDs associated with the corresponding accounts.

Similar to the current state data, the history state data can be kept under the account model. A pre-verification process can be performed by the blockchain nodes before consensus of a block.

After consensus of a block is reached, the updated account states are added to both the history state object database 804 and the history state database 806. For the history state object database 804, the updated account states and their corresponding hash values can be directly added as KVPs. For example, if the state object 2 is updated in a transaction included in the latest block, the hash value of the state object 2 and the state object 2 can be added as KVP, which can be expressed as <StateObject2hash, StateObject2>.

The hash values of the corresponding updated state objects can be used to update the history state database 806. For example, assume that the state object 1 to the state object 6 are associated with transactions included in the latest block appended to the blockchain 602, the KVPs formed by their corresponding account IDs and hash values of the updated state objects can be added to a new KVP bucket. A hash value of the new KVP bucket can be generated to serve as the key of a leaf node under the root node 808 corresponding to the latest block. For example, the key of the leaf node can be generated by hashing a combination of StateObject1Hash, StateObject2Hash, StateObject3Hash, StateObject4Hash, StateObject5Hash, and StateObject6Hash. Because the state trees in the history state database 806 are content-addressed, the tree structure under root node 808 can be added based on the content-addressable nature similar to an MPT.

Figure 9:
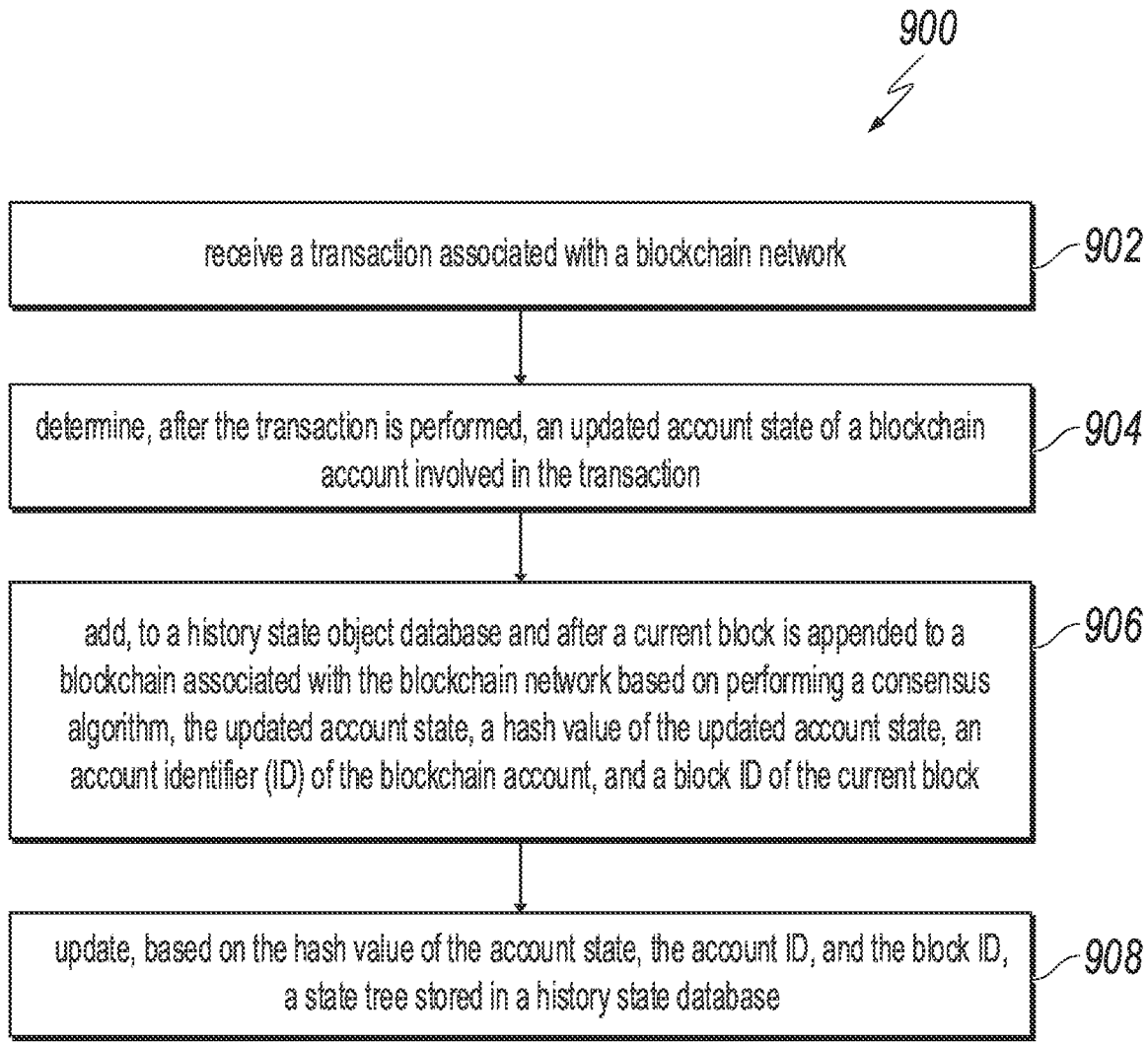
FIG. 9 depicts another example of a process that can be executed in accordance with embodiments of this specification.

FIG. 9 depicts another example of a process 900 that can be executed in accordance with embodiments of this specification. For convenience, the process 900 will be described as being performed by a system of one or more computers, located in one or more locations, and programmed appropriately in accordance with this specification. For example, a computing device in a computing system, e.g., the computing system 106, 108 of FIG. 1, appropriately programmed, can be a blockchain node that performs the process 900.

At 902, the blockchain node receives a transaction associated with a blockchain network. At 904, the blockchain node determines, after the transaction is performed, an updated account state of a blockchain account involved in the transaction.

At 906, the blockchain node adds, to a history state object database and after the current block is appended to a blockchain associated with the blockchain network based on performing a consensus algorithm, the updated account state, a hash value of the updated account state, an account ID of the blockchain account, and a block ID of a current block. In some embodiments, the consensus algorithm is based on one of PoW, PoS, and PBFT. In some embodiments, the consensus algorithm is performed after one or more of existence, validity, and authenticity of the transaction are verified.

At 908, based on the hash value of the account state, the account ID, and the block ID, the blockchain node updates a state tree stored in a history state database. In some embodiments, the state tree is a content-addressed state tree. In some embodiments, the history state object database stores a mapping between an account ID, a block ID, a hash value of an account state, and an account state of each blockchain account of the blockchain network and an account state of the corresponding blockchain account. In some embodiments, the content-addressed state tree is a history state tree of a FDMT or an MPT. In some embodiments, updating the state tree includes adding one or more branch nodes and a leaf node under a state root associated with the current block and store the hash value of the updated account state, the account ID in the leaf node. In some embodiments, the leaf node stores hash values of account states and account IDs corresponding to a plurality of blockchain accounts of the blockchain network. In some embodiments, the account IDs identify relative locations of corresponding hash values of account states of the plurality of blockchain accounts stored in the leaf node. In some embodiments, an address of the leaf node is a hash value generated based on the account states corresponding to the plurality of blockchain nodes.

Figure 10:
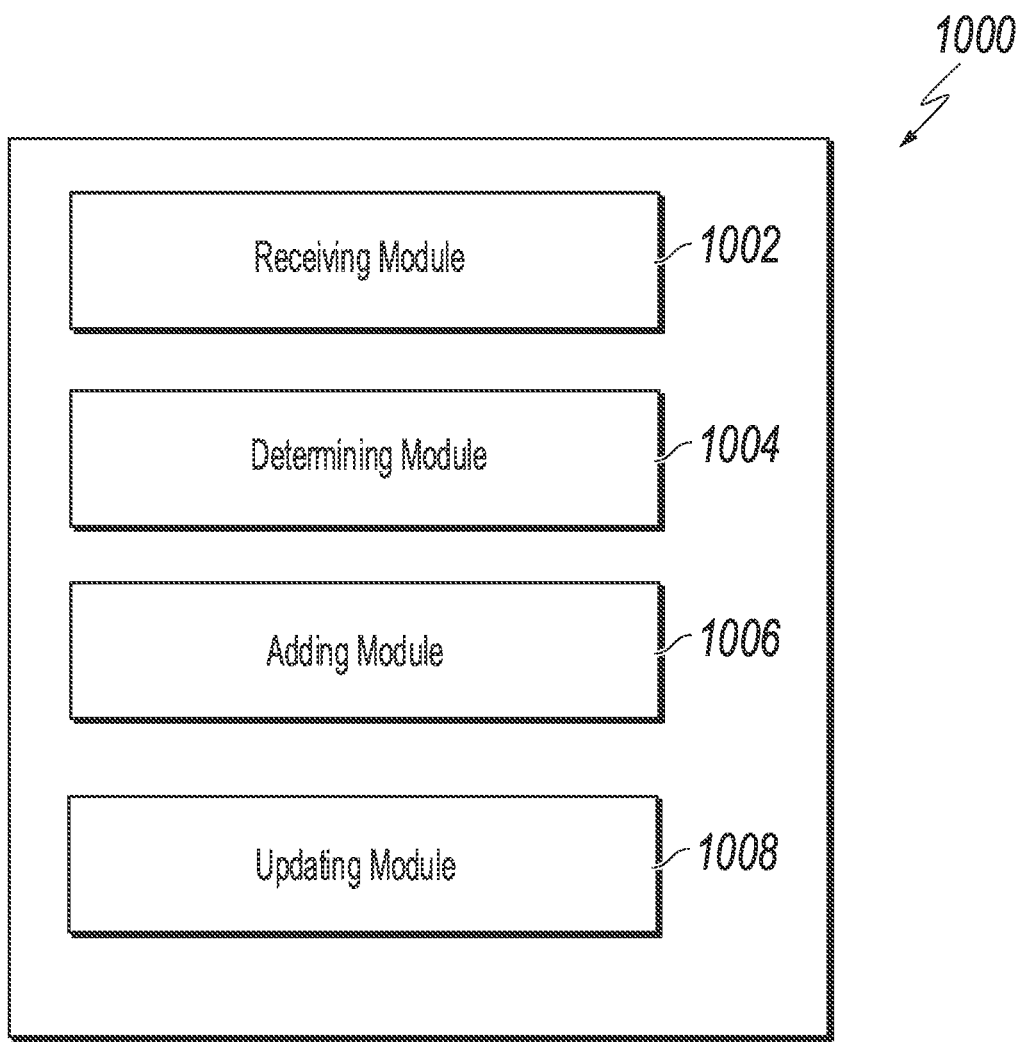
FIG. 10 depicts examples of modules of another apparatus in accordance with embodiments of this specification.

FIG. 10 depicts examples of modules of another apparatus 1000 in accordance with embodiments of this specification. The apparatus 1000 can be an example of an embodiment of a blockchain node configured to store blockchain data. The apparatus 1000 can correspond to the embodiments described above, and the apparatus 1000 includes the following: a receiving module 1002 that receives a transaction associated with a blockchain network; a determining module 1004 that determines, after the transaction is performed, an updated account state of a blockchain account involved in the transaction; an adding module 1006 that adds, to a history state object database and after the current block is appended to a blockchain associated with the blockchain network based on performing a consensus algorithm, the updated account state, a hash value of the updated account state, an account ID of the blockchain account, and a block ID of a current block; and an updating module 1008 that updates, based on the hash value of the account state, the account ID, and the block ID, a state tree stored in a history state database.

In some embodiments, the history state object database stores a mapping between an account ID, a block ID, a hash value of an account state, and an account state of each blockchain account of the blockchain network and an account state of the corresponding blockchain account.

In some embodiments, the consensus algorithm is based on one of PoW, PoS, and PBFT. In some embodiments, the state tree is a content-addressed state tree.

In some embodiments, the content-addressed state tree is a history state tree of a FDMT or an MPT. In some embodiments, updating the state tree includes adding one or more branch nodes and a leaf node under a state root associated with the current block and store the hash value of the updated account state, the account ID in the leaf node.

In some embodiments, the leaf node stores hash values of account states and account IDs corresponding to a plurality of blockchain accounts of the blockchain network. In some embodiments, the account IDs identify relative locations of corresponding hash values of account states of the plurality of blockchain accounts stored in the leaf node.

In some embodiments, an address of the leaf node is a hash value generated based on the account states corresponding to the plurality of blockchain nodes. In some embodiments, the consensus algorithm is performed after one or more of existence, validity, and authenticity of the transaction are verified.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIGS. 7 and 10, it can be interpreted as illustrating an internal functional module and a structure of a blockchain node. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for updating databases that store blockchain data, the method comprising:
   receiving a transaction associated with a blockchain network;
   determining, after the transaction is performed, an updated account state of a blockchain account involved in the transaction;
   appending, based on the updated account state, a current block to a blockchain associated with the blockchain network by performing a consensus algorithm;
   adding, to a current database, state information of the current block to a current state tree in the current database, wherein the state information of the current block comprises a block identifier (ID) of the current block, and the current state tree of the current database is a location-addressed state tree that comprises a node value associated with the block ID of the current block;
   adding, to a history state object database, the updated account state, a hash value of the updated account state, an account identifier (ID) of the blockchain account, and the block ID of the current block; and
   updating, based on the hash value of the updated account state, the account ID of the blockchain account, and the block ID of the current block, a state tree stored in a history state database, wherein the state tree of the history state database comprises a key-value pair (KVP) that is formed by the hash value of the updated account state and the account ID of the blockchain account.

2. The method of claim 1, wherein the history state object database stores a mapping between an account ID, a block ID, a hash value of an account state, and an account state of each blockchain account of the blockchain network and an account state of a corresponding blockchain account.

3. The method of claim 1, wherein the consensus algorithm is based on one of proof of work (PoW), proof of stake (PoS), and practical Byzantine fault tolerance (PBFT).

4. The method of claim 1, wherein the state tree is a content-addressed state tree.

5. The method of claim 4, wherein the content-addressed state tree is a history state tree of a fixed-depth Merkle tree (FDMT), a sparse Merkle Tree (SMT), or a Merkle Patricia tree (MPT).

6. The method of claim 1, wherein updating the state tree includes adding one or more branch nodes and a leaf node under a state root associated with the current block and store the hash value of the updated account state, the account ID of the blockchain account in the leaf node.

7. The method of claim 6, wherein the leaf node stores hash values of account states and account IDs corresponding to a plurality of blockchain accounts of the blockchain network.

8. The method of claim 7, wherein the account IDs identify relative locations of corresponding hash values of account states of the plurality of blockchain accounts stored in the leaf node.

9. The method of claim 7, wherein an address of the leaf node is a hash value generated based on account states corresponding to a plurality of blockchain nodes.

10. The method of claim 1, wherein the consensus algorithm is performed after one or more of existence, validity, and authenticity of the transaction are verified.

11. A computer-implemented system for updating databases that store blockchain data, comprising:
    one or more processors; and
    one or more computer-readable memories coupled to the one or more processors and having instructions stored thereon that are executable by the one or more processors to perform one or more operations comprising:
      receiving a transaction associated with a blockchain network;
      determining, after the transaction is performed, an updated account state of a blockchain account involved in the transaction;
      appending, based on the updated account state, a current block to a blockchain associated with the blockchain network by performing a consensus algorithm;
      adding, to a current database, state information of the current block to a current state tree in the current database, wherein the state information of the current block comprises a block identifier (ID) of the current block, and the current state tree of the current database is a location-addressed state tree that comprises a node value associated with the block ID of the current block;
      adding, to a history state object database, the updated account state, a hash value of the updated account state, an account identifier (ID) of the blockchain account, and the block ID of the current block; and updating, based on the hash value of the updated account state, the account ID of the blockchain account, and the block ID of the current block, a state tree stored in a history state database, wherein the state tree of the history state database comprises a key-value pair (KVP) that is formed by the hash value of the updated account state and the account ID of the blockchain account.

12. The computer-implemented system of claim 11, wherein the history state object database stores a mapping between an account ID, a block ID, a hash value of an account state, and an account state of each blockchain account of the blockchain network and an account state of a corresponding blockchain account.

13. The computer-implemented system of claim 11, wherein updating the state tree includes adding one or more branch nodes and a leaf node under a state root associated with the current block and store the hash value of the updated account state, the account ID of the blockchain account in the leaf node.

14. The computer-implemented system of claim 13, wherein the leaf node stores hash values of account states and account IDs corresponding to a plurality of blockchain accounts of the blockchain network.

15. The computer-implemented system of claim 14, wherein the account IDs identify relative locations of corresponding hash values of account states of the plurality of blockchain accounts stored in the leaf node.

16. The computer-implemented system of claim 14, wherein an address of the leaf node is a hash value generated based on account states corresponding to a plurality of blockchain nodes.

17. A non-transitory, computer-readable medium for updating databases that store blockchain data, the non-transitory, computer-readable medium storing one or more instructions executable by a computer system to perform operations comprising:

receiving a transaction associated with a blockchain network;

determining, after the transaction is performed, an updated account state of a blockchain account involved in the transaction;

appending, based on the updated account state, a current block to a blockchain associated with the blockchain network by performing a consensus algorithm;

adding, to a current database, state information of the current block to a current state tree in the current database, wherein the state information of the current block comprises a block identifier (ID) of the current block, and the current state tree of the current database is a location-addressed state tree that comprises a node value associated with the block ID of the current block;

adding, to a history state object database, the updated account state, a hash value of the updated account state, an account identifier (ID) of the blockchain account, and the block ID of the current block; and updating, based on the hash value of the updated account state, the account ID of the blockchain account, and the block ID of the current block, a state tree stored in a history state database, wherein the state tree of the history state database comprises a key-value pair (KVP) that is formed by the hash value of the updated account state and the account ID of the blockchain account.

18. The non-transitory, computer-readable medium of claim 17, wherein the history state object database stores a mapping between an account ID, a block ID, a hash value of an account state, and an account state of each blockchain account of the blockchain network and an account state of a corresponding blockchain account.

19. The non-transitory, computer-readable medium of claim 17, wherein updating the state tree includes adding one or more branch nodes and a leaf node under a state root associated with the current block and store the hash value of the updated account state, the account ID of the blockchain account in the leaf node.

20. The non-transitory, computer-readable medium of claim 19, wherein the leaf node stores hash values of account states and account IDs corresponding to a plurality of blockchain accounts of the blockchain network.

* * * * *